June 10, 1958 W. D. CANNON 2,838,616

REPEATER AMPLIFIER

Filed April 17, 1953

INVENTOR.
W. D. CANNON

BY Edward R. Hyde Jr.

ATTORNEY

United States Patent Office 2,838,616

Patented June 10, 1958

2,838,616

REPEATER AMPLIFIER

William D. Cannon, Metuchen, N. J., assignor to The Western Union Telegraph Company, New York, N. Y., a corporation of New York Application April 17, 1953, Serial No. 349,504

2 Claims. (Cl. 179—171)

This invention relates to submersible repeaters employed in undersea cables, and more particularly to an improved amplifier and wave shaping network for such repeaters.

An amplifier for a submersible repeater must be designed to provide high gain with minimum signal distortion and require minimum operating power.

Accordingly, it is an object of this invention to provide an improved amplifier especially adapted for submersible cable repeaters.

A further object is an amplifier design giving minimum signal distortion.

Another object of this invention is to provide an amplifier wherein the operating power requirement is a minimum.

A still further object of the invention is to provide an improved wave shaping network for message signals received over a submarine cable circuit.

These and other objects are achieved by employing a single-sided multi-stage amplifier whose output is resistance coupled to the outgoing cable section. The use of resistance coupling, thereby eliminating an output transformer, increases the available gain, avoids signal phase shift and frequency distortion and reduces the bulk of the equipment enclosed in the submersible repeater. Further, the resistance of the heater elements of the tubes is utilized as the output resistance coupling, thereby decreasing the power requirements of the unit, an important factor in submarine cable systems.

Figure 1:
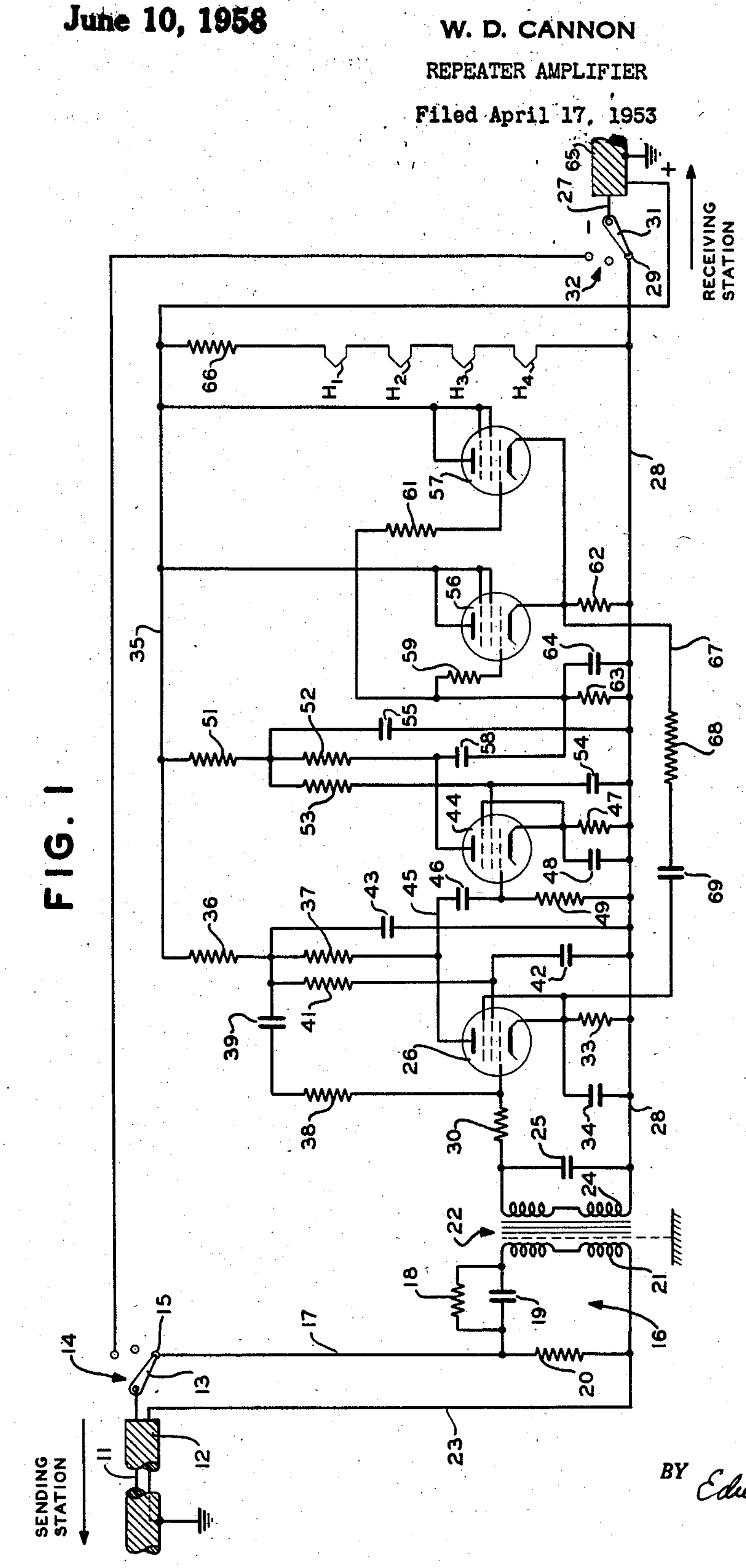
Figure 2:
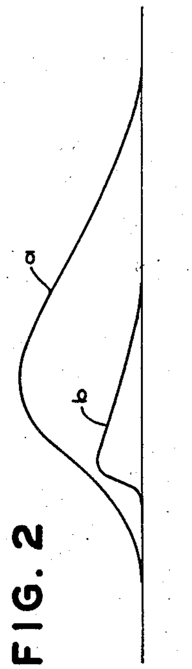

Other objects and novel features of the invention will be apparent from the following description taken in connection with the drawings in which:

Fig. 1 is a circuit diagram of a repeater amplifier and wave shaping network; and Fig. 2 illustrates transient wave shapes of message pulses.

Message signals from a sending station are transmitted over a conductor 11 of cable 12 to the tongue 13 of a switch 14 normally positioned on contact 15 which is connected to wave shaping network 16 over conductor 17. The wave shaping network comprises a paralleled resistor 18 and capacitor 19 connected to one end of primary winding 21 of transformer 22, the other end of which is returned to ground over wire 23 to the cable armor. Resistor 20 connects contact 15 to cable ground conductor 23.

Transformer secondary winding 24 is shunted by capacitor 25 and one end thereof connects to the control grid of tube 26 through resistor 30. The other end of the secondary winding is carried through to cable conductor 27 by wire 28, switch contact 29 and tongue 31 of switch 32. Negative operating potential is supplied to conductor 28 from the shore receiving station over cable conductor 27. The source of operating potentials at the receiving end of the cable may be supplied by a system as shown in U. S. Patent No. 2,794,853 of P. H. Wells et al. Bias is supplied to tube 26 by cathode resistor 33 and capacitor 34. The anode of tube 26 is supplied with positive potential from grounded conductor 35 through anode resistors 36 and 37. The series combination of resistor 38 and capacitor 39 connecting the anode and control grid of tube 26, degeneratively feeds a portion of the output signal back to the grid thereby suppressing the tendency toward oscillation due to the connection of the cathode with the amplifier output circuit. The screen grid of tube 26 connects to the common point of serially connected resistor 41 and by-pass capacitor 42. The other end of capacitor 42 connects to conductor 28, and the other end of resistor 41 connects to the common point of resistors 36 and 37. Capacitor 43 connects conductor 28 with the junction point of anode resistors 36 and 37. The output of tube 26 is fed to the control grid of tube 44 by conductor 45 and coupling capacitor 46. Bias is supplied to tube 44 by resistor 47 and capacitor 48. Resistor 49 connects the control grid with conductor 28. The anode of tube 44 is supplied with positive potential by grounded conductor 35 and anode resistors 51 and 52. The suppressor grid is connected to the cathode. The serially connected resistor 53 and capacitor 54 join the common point of resistors 51 and 52 with conductor 28. The screen grid is connected to the junction point of resistor 53 and capacitor 54. Capacitor 55 connects the common point of the anode resistors with conductor 28.

The output of tube 44 is fed to the control grids of parallel connected tube 56 and 57 by coupling capacitor 58 and resistors 59 and 61 respectively. Though two parallel connected tubes are shown in the drawing, it is understood that any number may be so connected without departing from the scope of the invention. A cathode resistor 62 connects the cathodes of tubes 56 and 57 to conductor 28 and a parallel combination of resistor 63 and capacitor 64 connect the junction of resistor 59 and capacitor 58 to conductor 28.

The output of the amplifier is resistance coupled to the outgoing cable section 65 by a series combination of resistances connected to grounded conductor 35 and cable conductor 27. The output coupling resistance conveniently comprises the heating elements H1, H2, H3 and H4, of the tubes 26, 44, 56 and 57, in series with any additional resistance 66 as may be necessary for efficient coupling. It is seen therefore that the tube heaters perform a dual function. In addition to their cathode heating function, the resistance of the heaters is employed as a coupling resistance thereby eliminating the necessity of a separate resistance for this purpose. This is an important feature of the present invention inasmuch as the power requirement of the amplifier and the losses therein are minimized.

Negative feedback is provided by conductor 67, resistor 68 and condenser 69 connecting the cathodes of the parallel connected output tubes 56 and 57 with the cathode of tube 26.

This feedback network functions to feed intermediate frequency components of the signal pulses to the cathode of the input stage to suppress such frequencies and change the shape of the signal pulses as hereinafter shown. Though the feedback circuit disclosed takes the form of a single branch RC circuit, it is understood that other circuits may be employed, depending upon the wave shaping desired, without departing from the scope of the invention. Capacitors 34 and 48 in the cathode circuits of tubes 26 and 44 respectively also function to change the wave shape of received signals by suppressing low frequency components thereof.

Wave shaping network 16 hereinbefore referred to has two functions. It serves as an impedance matching network to match the impedance of cable section 12 with the impedance of transformer 22. Further, in conjunction with the feedback circuits, it reshapes the transmitted message pulses by shifting the low frequency components thereof with respect to the high frequency components. Referring to Fig. 2, wave *a* represents the shape of a message pulse as received at the repeater. The leading edge of this wave is seen to have a slope insufficiently steep for proper operation of the receiving apparatus. Also, the amplitude of this wave would produce too great a swing of the grid of tube 26. Hence, the wave shaping network is provided to reshape incoming wave *a* to that shown by *b* in Fig. 2. Wave *b* has a steeper leading edge than received wave *a* and a relatively smaller amplitude. Referring now to the wave shaping network of Fig. 1, the parallel combination of resistor 18 and capacitor 19 in series with the cable circuit presents a smaller impedance to high frequency components of a signal pulse than to low frequency components. The primary winding 21 of transformer 22 is designed to have low inductance, and being shunted across the cable circuit offers a higher impedance to high frequency components of a signal than to low frequency components. Both these combinations cooperate to shift the relative phase of the low frequency components of a signal with respect to the high frequency components to transform the shape of wave *a* to that of wave *b*. Capacitor 19 and primary 21 of transformer 22 may be tuned to 1.5 times the dot frequency to peak the received signals at this frequency.

The wave shaping features above described will depend upon many factors, including the type of output coupling employed. It is readily seen that the signal phase shift that would occur with a transformer coupled output as hereinbefore used in submersible repeater amplifiers would have to be compensated for by the wave shaping circuits. However, with the resistance coupled output as employed in the present invention, and wherein such signal phase shift is avoided, the wave shaping circuit is accordingly modified.

Switches 14 and 32 may be ganged and remotely operated from a shore station by mechanism disclosed in copending application Serial No. 261,512 of Cannon et al., filed December 13, 1951, now Patent No. 2,683,188. The switching mechanism may be adapted to bypass the repeater amplifier, switch in a spare amplifier or set up the cable circuit for various tests. This switching mechanism forms no part of the present invention.

The principles of the invention are set forth above with reference to the disclosed specific embodiment. However, the said embodiment is not to be considered as limiting the scope of the invention as defined by the appended claims.

What is claimed is:

1. In a submersible repeater interposed in a submarine cable circuit whereby said cable has a repeater input end and a repeater output end, a repeater amplifier having a cable input side and a cable output side and adapted to receive operating potentials over said cable circuit comprising a plurality of electron discharge tubes, a heater element in each tube, means to couple the input side of said repeater amplifier to the cable input end whereby message signals are applied to said amplifier and means intercoupling the amplifier output side and the cable output end whereby the message signals are applied to said cable output end, said last named means including resistance coupling means connected directly to the anode of the final electron discharge tube and to the cable output end, said resistance coupling means including a plurality of said heater elements serially connected.

2. In a submersible repeater adapted to be interposed in a submarine cable circuit and having a cable input side and a cable output side, a repeater amplifier for amplifying message signals and adapted to receive operating potentials over said cable circuit comprising a plurality of intercoupled electron discharge tubes, circuit means including a transformer intercoupling the input of said amplifier with the cable input end whereby message signals are applied to said amplifier and a resistance network connected directly across said amplifier output end intercoupling said amplifier to the cable output end whereby the message signals are applied to said cable output end, said resistance network means including the heater element of each of said electron discharge tubes serially connected.

References Cited in the file of this patent

UNITED STATES PATENTS

| | | |
|---|---|---|
| 1,833,968 | Holden | Dec. 1, 1931 |
| 2,212,839 | Lett | Aug. 7, 1940 |
| 2,216,168 | Geiger | Oct. 1, 1940 |
| 2,321,723 | Zinn | June 15, 1943 |
| 2,462,849 | Dishal et al. | Mar. 1, 1949 |
| 2,575,107 | Hobbs et al. | Nov. 13, 1951 |
| 2,584,386 | Hare | Feb. 5, 1952 |
| 2,586,167 | Kamm | Feb. 19, 1952 |
| 2,605,358 | Neher | July 29, 1952 |
| 2,609,442 | Hester | Sept. 2, 1952 |

FOREIGN PATENTS

| | | |
|---|---|---|
| 314,788 | Great Britain | July 2, 1928 |
| 67,397 | Norway | Feb. 7, 1944 |

OTHER REFERENCES

Bell Telephone System Tech. Journal Monograph 1815, published 1951 (p. 11 pertinent), "A Submarine Telephone Cable With Submerged Repeaters," by Gilbert.